US012766844B2

(12) United States Patent
Asada et al.

(10) Patent No.: US 12,766,844 B2
(45) Date of Patent: Oct. 20, 2026

(54) LIQUID EJECTING APPARATUS

(71) Applicant: CANON KABUSHIKI KAISHA, Tokyo (JP)

(72) Inventors: Shota Asada, Tokyo (JP); Hideaki Matsumura, Tokyo (JP); Tsuyoshi Saeki, Kanagawa (JP); Norio Sakurai, Tokyo (JP); Taiji Maruyama, Kanagawa (JP); Hiromasa Tsutsumi, Kanagawa (JP); Yusuke Naratani, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 126 days.

(21) Appl. No.: 18/809,828

(22) Filed: Aug. 20, 2024

(65) Prior Publication Data

US 2025/0065635 A1 Feb. 27, 2025

(30) Foreign Application Priority Data

Aug. 24, 2023 (JP) ................................ 2023-136260

(51) Int. Cl.
*B41J 2/175* (2006.01)

(52) U.S. Cl.
CPC ....... *B41J 2/17513* (2013.01); *B41J 2/17506* (2013.01); *B41J 2/17536* (2013.01)

(58) Field of Classification Search
CPC .... B41J 2/175; B41J 2/17513; B41J 2/17506; B41J 2/17536
USPC ........................................................ 347/86
See application file for complete search history.

(56) References Cited

U.S. PATENT DOCUMENTS

2012/0182364 A1* 7/2012 Takeda ................ B41J 2/17506 347/85
2016/0263905 A1 9/2016 Kimura
2018/0345675 A1* 12/2018 Kawagoe ............ B41J 2/17523
2022/0032633 A1 2/2022 Shimada

FOREIGN PATENT DOCUMENTS

JP 2016168835 A 9/2016

* cited by examiner

*Primary Examiner* — Mark Edwards
(74) *Attorney, Agent, or Firm* — Canon U.S.A., Inc. IP Division

(57) ABSTRACT

An apparatus includes a tank and a wall. The tank includes a tank container and a film. The tank container includes a chamber. The chamber is capable of containing a liquid to be supplied to an ejection head configured to eject the liquid. The chamber has an opening at a side face of the tank container. An outline of the opening is enclosed by a first rib. The film seals the opening. The wall is disposed at a position of facing the film, and includes a protruding portion protruding toward the film. The protruding portion faces a second rib provided on the tank container, apart from the first rib. The protruding portion does not face the first rib.

5 Claims, 9 Drawing Sheets

LIQUID EJECTING APPARATUS

BACKGROUND OF THE INVENTION

Field of the Invention

Some aspects of the embodiments relate to a liquid ejecting apparatus.

Description of the Related Art

An inkjet recording apparatus, which is an example of a liquid ejecting apparatus, includes an ink tank capable of containing ink to be supplied to a recording head configured to eject a liquid. In a structure according to related art, generally, an ink tank is provided for each type of ink that can be ejected from a recording head, and these ink tanks are arranged in a line in one direction. In an ink tank according to related art, a containing chamber configured to contain ink is formed by bonding a film to a tank container one side of which is open.

Japanese Patent Laid-Open No. 2016-168835 discloses a liquid ejecting apparatus having a structure in which plural ink tanks are arranged with clearances left enough so that each film will not be damaged due to contact of the ink tanks with each other.

However, in the structure disclosed in Japanese Patent Laid-Open No. 2016-168835, there is a risk of an increase in apparatus size because the tanks are arranged with sufficient spacing therebetween.

Some aspects of the embodiments provide a liquid ejecting apparatus that makes it possible to suppress liquid leakage while suppressing an increase in apparatus size.

SUMMARY OF THE INVENTION

A liquid ejecting apparatus includes a tank and a wall. The tank includes a tank container and a film. The tank container includes a chamber. The chamber is capable of containing a liquid to be supplied to an ejection head configured to eject the liquid. The chamber has an opening at a side face of the tank container. An outline of the opening is enclosed by a first rib. The film seals the opening. The wall is disposed at a position of facing the film, and includes a protruding portion protruding toward the film. The protruding portion faces a second rib provided on the tank container, apart from the first rib. The protruding portion does not face the first rib.

Further features of the present invention will become apparent from the following description of exemplary embodiments with reference to the attached drawings.

DESCRIPTION OF THE EMBODIMENTS

Embodiments of the present disclosure will be described below with reference to the drawings. The embodiments described below, however, shall not be construed to limit the present disclosure. Not all of the features described in the embodiments necessarily have to be combined for providing solutions proposed in the present disclosure. The relative arrangement, shapes, and the like of components described in the embodiments are just examples, and, as such, are not intended to restrict the scope of the present disclosure.

The term “recording” as used herein includes not only a case of forming information having a meaning such as characters, a figure, or the like but also a wide variety of cases of forming an image, a design, a pattern, or the like on a recording medium regardless of whether it has a meaning or not, or cases of processing the medium. It does not matter whether the “recorded” entity is manifested so as to be visually perceptible to the human eye or not. Though the “recording medium” is assumed to be paper in the present embodiment, it may be a cloth, a plastic sheet, a film, or the like.

The term “ink” (sometimes referred to as “liquid”) shall also be given a broad interpretation, as is the case with the above definition of “recording”. Therefore, this term means a liquid that can be used for, by being applied onto a recording medium, forming an image, a design, a pattern, or the like thereon, processing the recording medium, or treating ink (for example, coagulating a colorant contained in the ink applied onto the recording medium or making it insoluble).

First Embodiment

Figure 1:
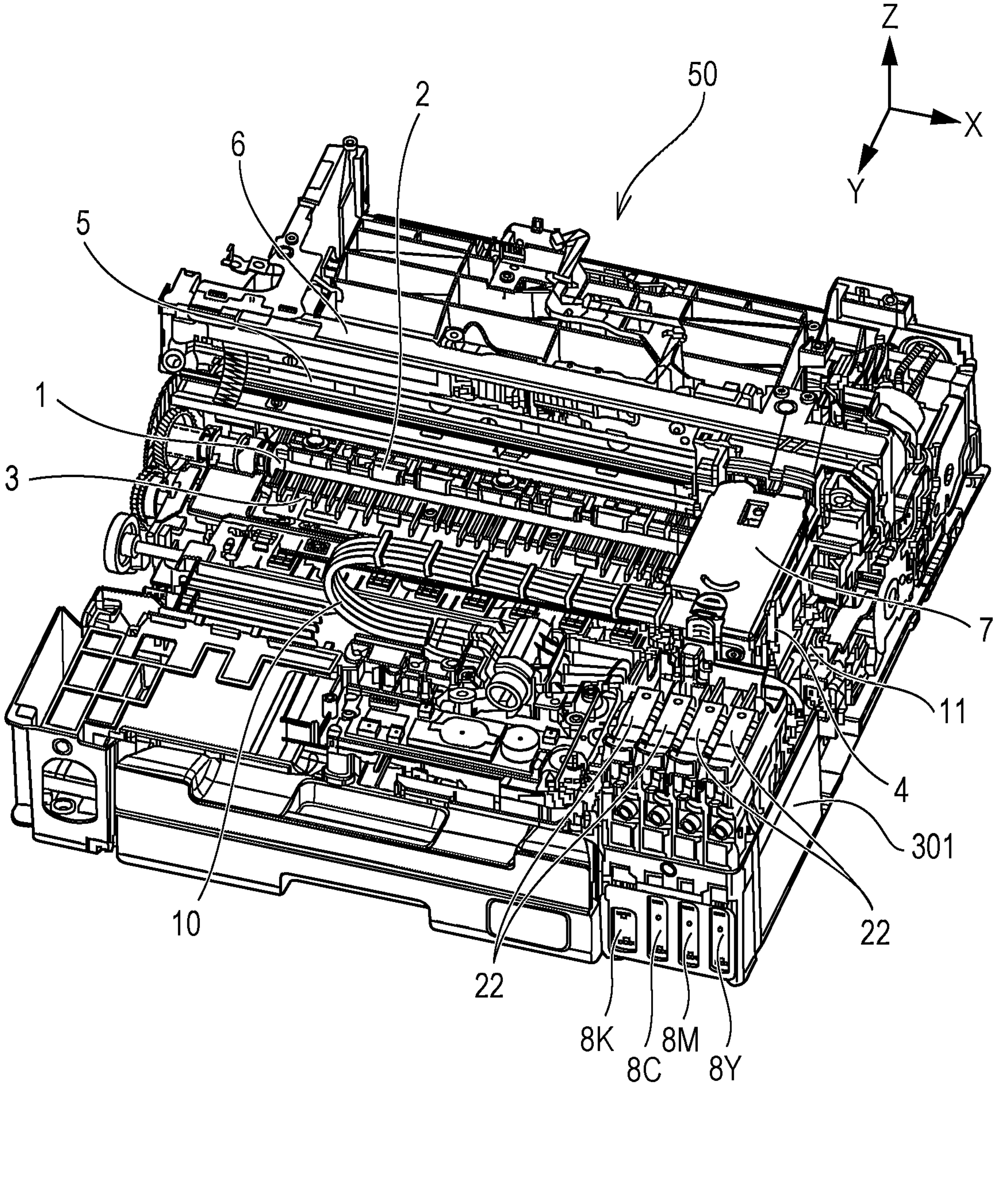
FIG. 1 is a perspective view of a recording apparatus according to a first embodiment.

FIG. 1 is a perspective view of an inkjet recording apparatus 50 (hereinafter referred to as “recording apparatus 50”), which is an example of a liquid ejecting apparatus to which the disclosed structure is applied. The recording apparatus 50 includes a feeding roller (not illustrated) configured to feed a recording medium (not illustrated), a conveying roller 1 configured to convey the recording medium, and a pinching roller 2 configured to rotate as a slave when driven by rotation of the conveying roller 1. The recording medium is conveyed onto a platen 3 in a state of being nipped between the conveying roller 1 and the pinching roller 2. The conveying roller 1 is a metal roller the surface of which has fine irregularities formed so as to produce a large frictional force. The pinching roller 2 is elastically urged against the conveying roller 1 by a pusher such as a spring that is not illustrated.

The platen 3 supports the back of the recording medium such that either a fixed distance or a predetermined distance is kept between an ink ejecting surface of a recording head 4 (ejection head) configured to eject ink and the front of the recording medium facing the ink ejecting surface. The recording medium supported by the platen 3, after an image is formed by the recording head 4 thereon, is discharged to the outside of the recording apparatus 50 by a discharging roller that is not illustrated and a spur that is a rotating member configured to rotate as a slave when driven by rotation of the discharging roller. The discharging roller is a rubber roller having a large friction coefficient. The spur is elastically urged against the discharging roller by a pusher such as a spring that is not illustrated.

The recording head 4 is mounted on a carriage 7 and is capable of reciprocating in the X direction along guide rails 5 and 6 disposed above and below itself by a driver such as a motor that is not illustrated. The recording head 4, when performing recording on a recording medium, ejects ink while moving in the X direction together with the carriage 7 to record an image for one line having a predetermined length in the Y direction. After that, the recording medium is conveyed by a predetermined amount by the conveying roller 1 and the pinching roller 2. Then, the recording head 4 records an image for one line again on the recording medium.

The X direction and the Y direction are horizontal directions intersecting with (in the present embodiment, orthogonal to) each other. The Z direction is a direction intersecting with (in the present embodiment, orthogonal to) both the X direction and the Y direction, and corresponds to the direction of gravity.

The recording head 4 includes a means configured to produce a thermal energy (for example, heating resistance elements) as an energy to be used for ink ejection. A scheme of causing a change in status of ink by using this thermal energy (film boiling) is used herein. This achieves high density and high definition of recording. The ejection scheme employed by the recording head 4 is not limited to the thermal energy scheme. For example, other known schemes may be used such as a vibration energy instead.

Nozzle rows for ejecting ink of different colors are provided for the respective colors in the recording head 4. A plurality of ink tanks 8 independent of one another is fixed to the body of the apparatus in such a way as to correspond to the colors of ink ejected from the recording head 4. Through a plurality of supply tubes 10 corresponding to the respective colors of ink, the ink tanks 8 are connected to the recording head 4 via non-illustrated joints. Ink contained in each of the ink tanks 8 is supplied to the corresponding one of the nozzle rows of the recording head 4 through the corresponding one of the supply tubes 10 independently of the others.

A recovery unit 11 is disposed at a non-recording area in such a way as to face the ink ejecting surface of the recording head 4. The non-recording area is an area located within a range of reciprocation of the recording head 4 but outside a passing range of a recording medium that is conveyed. The recovery unit 11 includes a cap configured to cap the ink ejecting surface of the recording head 4, a suction mechanism configured to suck ink forcibly out of the recording head 4 with the ink ejecting surface capped, and a wiper configured to wipe the ink ejecting surface clean.

Each of the ink tanks 8 is provided for the corresponding one of the colors of ink. The supply tubes 10 are connected to the ink tanks 8 respectively. An ink tank 8K containing black ink, an ink tank 8C containing cyan ink, an ink tank 8M containing magenta ink, and an ink tank 8Y containing yellow ink are provided in the recording apparatus 50. These ink tanks are collectively referred to as the ink tank(s) 8. Each of the ink tanks 8 is fixed to a case 301 provided in the recording apparatus 50. In the present embodiment, a common-part design is adopted for the ink tanks 8C, 8M, and 8Y each containing color ink, and the shape of the ink tank 8K, which contains black ink, is different from the shape of the other three ink tanks.

On the top of the ink tank 8, there is provided an inlet spout 23 (see FIG. 2) through which the user pours ink into the ink tank 8 from a container that contains the ink, for example, from an ink bottle. A lid member 22 for hermetically closing the inlet spout 23 is provided in such a way as to be able to be opened and closed, for each of the colors of ink.

Figure 2B:
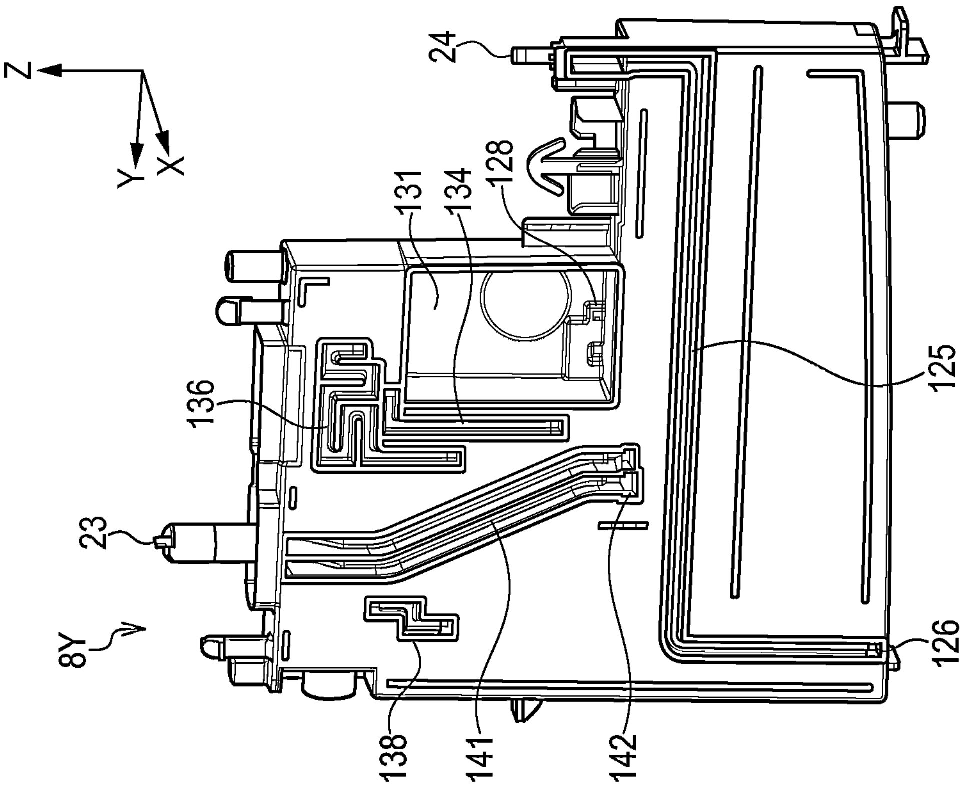
FIG. 2A, 2B is a side view illustrating the structure of an ink tank that contains yellow ink according to the first embodiment.
Figure 2A:
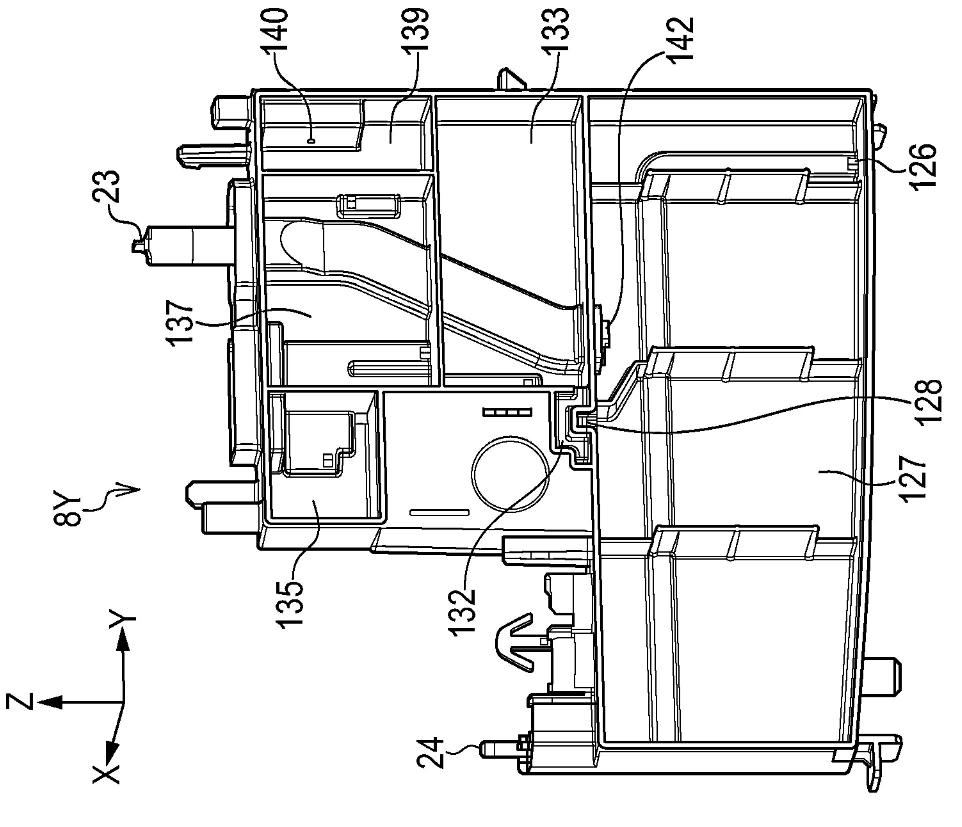

Next, with reference to FIGS. 2, 3, and 6, the structure of the ink tank 8 according to the present embodiment will now be described in detail. FIG. 2 is a set of side views illustrating the structure of the ink tank 8Y, which contains yellow ink. FIG. 2A is a side view of the left side of the ink tank 8Y when the recording apparatus 50 is viewed from the front. FIG. 2B is a side view of the right side of the ink tank 8Y when the recording apparatus 50 is viewed from the front.

Since the basic structure of ink tanks other than the ink tank 8Y is the same as that of the ink tank 8Y, an explanation thereof is omitted. That is to say, while the description and drawings of the ink tank is with reference to ink tank 8Y, it is not limited to only that ink tank, and the description is applicable also to the other ink tanks.

Ink having been poured in through the inlet spout 23 flows through a flow passage 141 and then enters an ink containing chamber 127 through an opening 142. An opening 126 provided in the bottom of the ink containing chamber 127 or near the bottom thereof is in communication with a tube joint 24, to which the supply tube 10 is connected, through a communication passage 125. The tube joint 24 serves also as an outlet portion through which the ink contained in the ink containing chamber 127 exits to the outside of the ink tank 8.

The left side face of the ink containing chamber 127 is open. A film that is not illustrated is thermally fusion-bonded thereto so as to seal this opening, thereby making it possible for the ink containing chamber 127 to contain ink. Similarly, the communication passage 125 has a right-side-open groove shape. Another film, which is not the film that is thermally fusion-bonded to the ink containing chamber 127, is thermally fusion-bonded thereto so as to hermetically close this opening; by this means, the communication passage 125 serves as a flow passage through which ink can pass. That is, the ink tank 8 according to the present embodiment refers to a container that is in a state in which a film is thermally fusion-bonded to a tank having the ink containing chamber 127 and the communication passage 125.

The ink tank 8Y includes a buffer chamber(s) that is in communication with the atmosphere and serves also as a containing chamber capable of accommodating ink having overflowed from the ink containing chamber 127. For example, when the ink tank 8Y is upset to change in position with ink contained in the ink containing chamber 127, it could happen that the ink overflows from the ink containing chamber 127. Each buffer chamber is configured to be able to accommodate the ink having overflowed in this case. The ink tank 8Y includes a plurality of buffer chambers. All of the buffer chambers are designed to be located above the ink containing chamber 127 when the recording apparatus 50 is in use position.

The ink containing chamber 127 is in communication with a buffer chamber 131 through an opening 128. The buffer chamber 131 is in communication with a buffer chamber 133 through a flow passage 132. The buffer chamber 133 is in communication with a buffer chamber 135 through a flow passage 134. The buffer chamber 135 is in communication with a buffer chamber 137 through a flow passage 136. The buffer chamber 137 is in communication with a buffer chamber 139 through a flow passage 138. The buffer chamber 139 is in communication with external air through an air communication port 140.

The buffer chamber 131 is open in the direction that is the opposite of the direction in which the ink containing chamber 127 is open. This opening of the buffer chamber 131 is sealed by a film 203 (see FIG. 3B) by which the opening of the communication passage 125 is sealed. On the other hand, the flow passage 132 is open in the direction that is the same as the direction in which the ink containing chamber 127 is open. This opening of the flow passage 132 is sealed by the same film as the one by which the opening of the ink containing chamber 127 is sealed. That is, the buffer chamber 131 and the flow passage 132 are configured such that their respective opening directions are the opposite of each other.

The other buffer chambers 133, 135, 137, and 139 are open in the direction that is the same as the direction in which the ink containing chamber 127 is open, and their openings are sealed by the same film as the one by which the opening of the ink containing chamber 127 is sealed. On the other hand, the flow passages 134, 136, and 138 are open in the direction that is the opposite of the direction in which the ink containing chamber 127 is open, and their openings are sealed by the film 203 by which the opening of the communication passage 125 is sealed. That is, the buffer chambers 135, 137, and 139 are configured such that their opening direction is the opposite of the opening direction of the flow passages 134, 136, and 138, each of which provides corresponding buffer-to-buffer communication.

Because of the structure described above, in a case where the ink tank 8Y is upset in such a manner that its left side face (the side where there is the opening of the ink containing chamber 127) faces down, each of its flow passages comes to an upper position. That is, even if ink is contained in the buffer chamber 133 in this state, it follows that the flow passage 134 is located above the surface level of the ink contained therein. This obstructs ink movement from each buffer chamber to each flow passage and therefore suppresses ink leakage from the ink tank 8Y to the outside. The structure described here is adopted not only for the ink tank 8Y but also for the ink tank 8K, the ink tank 8C, and the ink tank 8M.

Figure 3B:
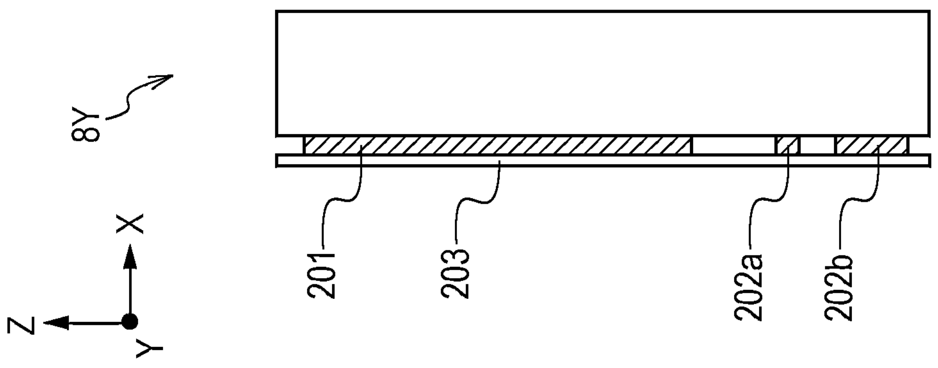
FIG. 3A, 3B is a diagram for explaining ribs to which a film is thermally fusion-bonded in the ink tank according to the first embodiment.
Figure 3A:
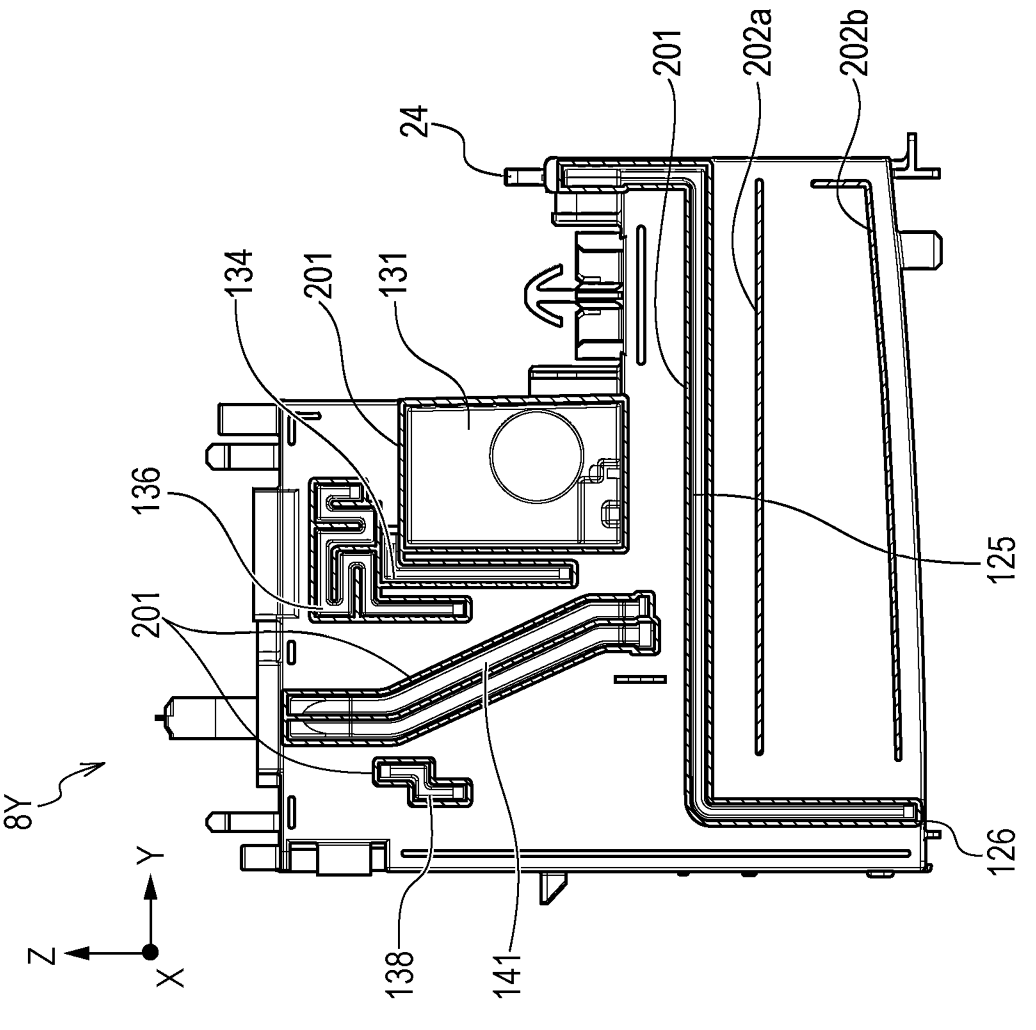

FIG. 3 is a set of diagrams for explaining ribs to which the film 203 is thermally fusion-bonded in the ink tank 8Y. FIG. 3A is a right side view of the ink tank 8Y. Outline ribs 201, which define outlines of openings constituting the communication passage 125, the buffer chamber 131, and the flow passages 134, 136, 138, and 141, are provided on the right side face of the ink tank 8Y. In addition, a rib 202*a* and a rib 202*b* are provided on the right side face of the ink tank 8Y. Each of the rib 202*a* and the rib 202*b* is provided in such a way as to protrude outward from an outer wall that forms the ink containing chamber 127. In the present embodiment, each of the rib 202*a* and the rib 202*b* has a linear shape extending in the Y direction. The rib 202*a* and the rib 202*b* are spaced apart from each other in the Z direction. In the description below, the rib 202*a* and the rib 202*b* will sometimes be collectively referred to as the rib(s) 202.

FIG. 3B is a side view of the neighborhood of the rib 202 when the ink tank 8Y is viewed from the downstream side in the Y direction. As described above, the film 203 is fusion-bonded to the right side face of the ink tank 8Y. Specifically, the film 203 is thermally fusion-bonded to the outline ribs 201 and the ribs 202.

This bonding seals the communication passage 125, the buffer chamber 131, and the flow passages 134, 136, 138, and 141, which are enclosed by the outline ribs 201. Moreover, since the protrusion height of the outline ribs 201 and the ribs 202 is made uniform through the process of thermally fusion-bonding the film 203, the right side face of the ink tank 8Y to which the film 203 is bonded is configured to be a step-free flat face.

Figure 4B:
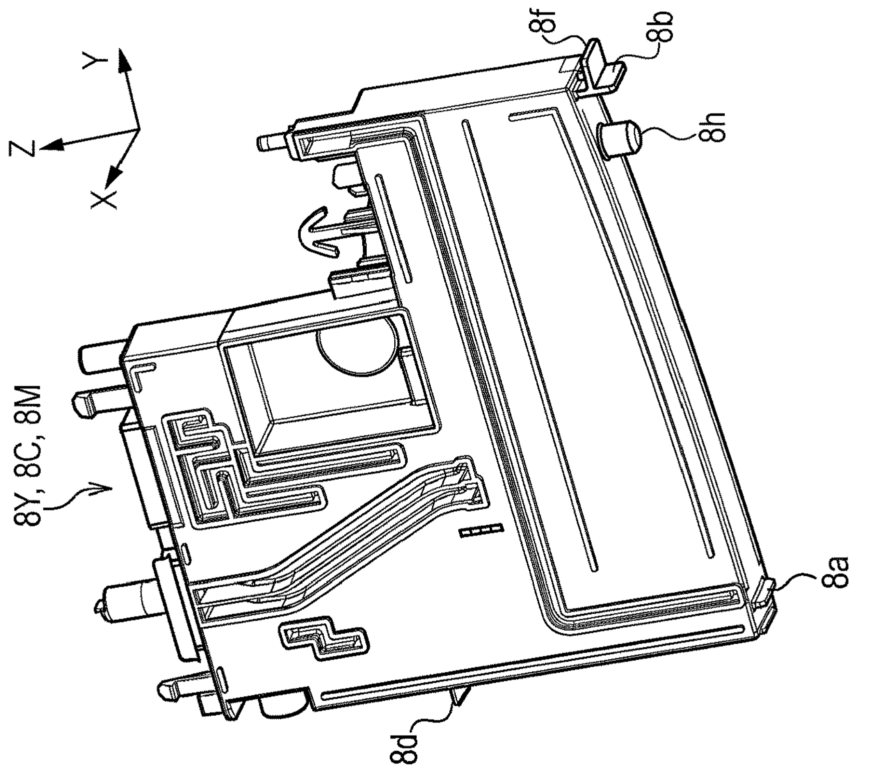
FIG. 4A, 4B is a diagram for explaining the structure of a black/color ink tank according to the first embodiment.
Figure 4A:
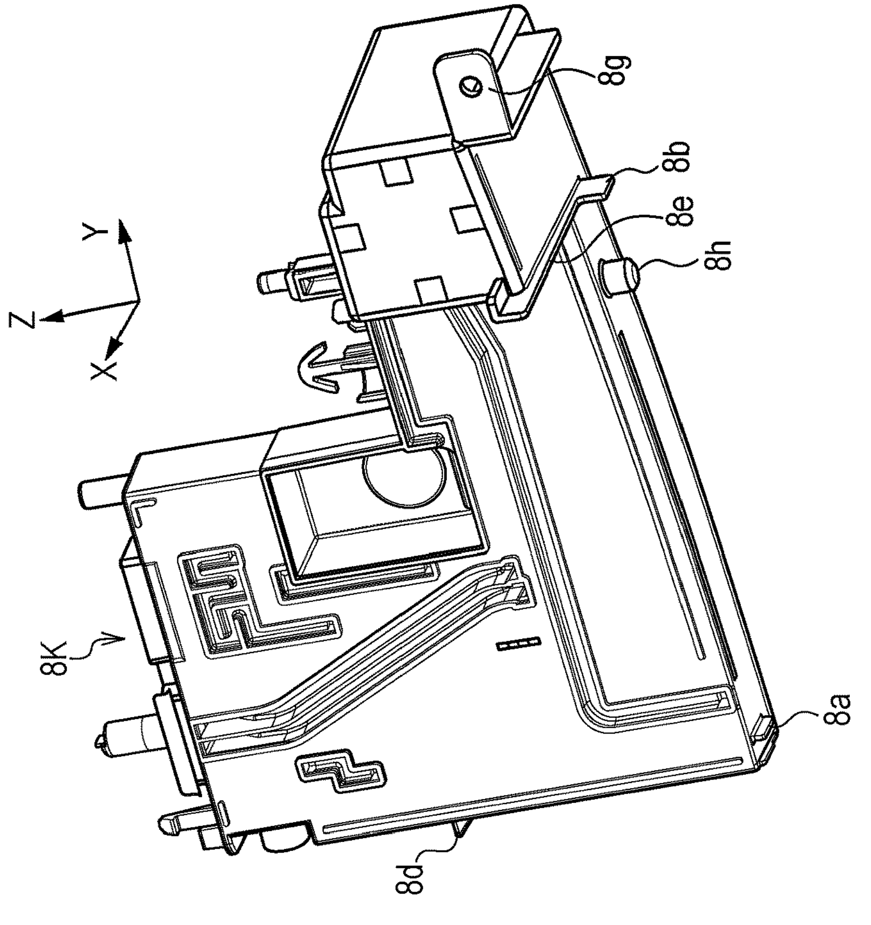
Figure 5:
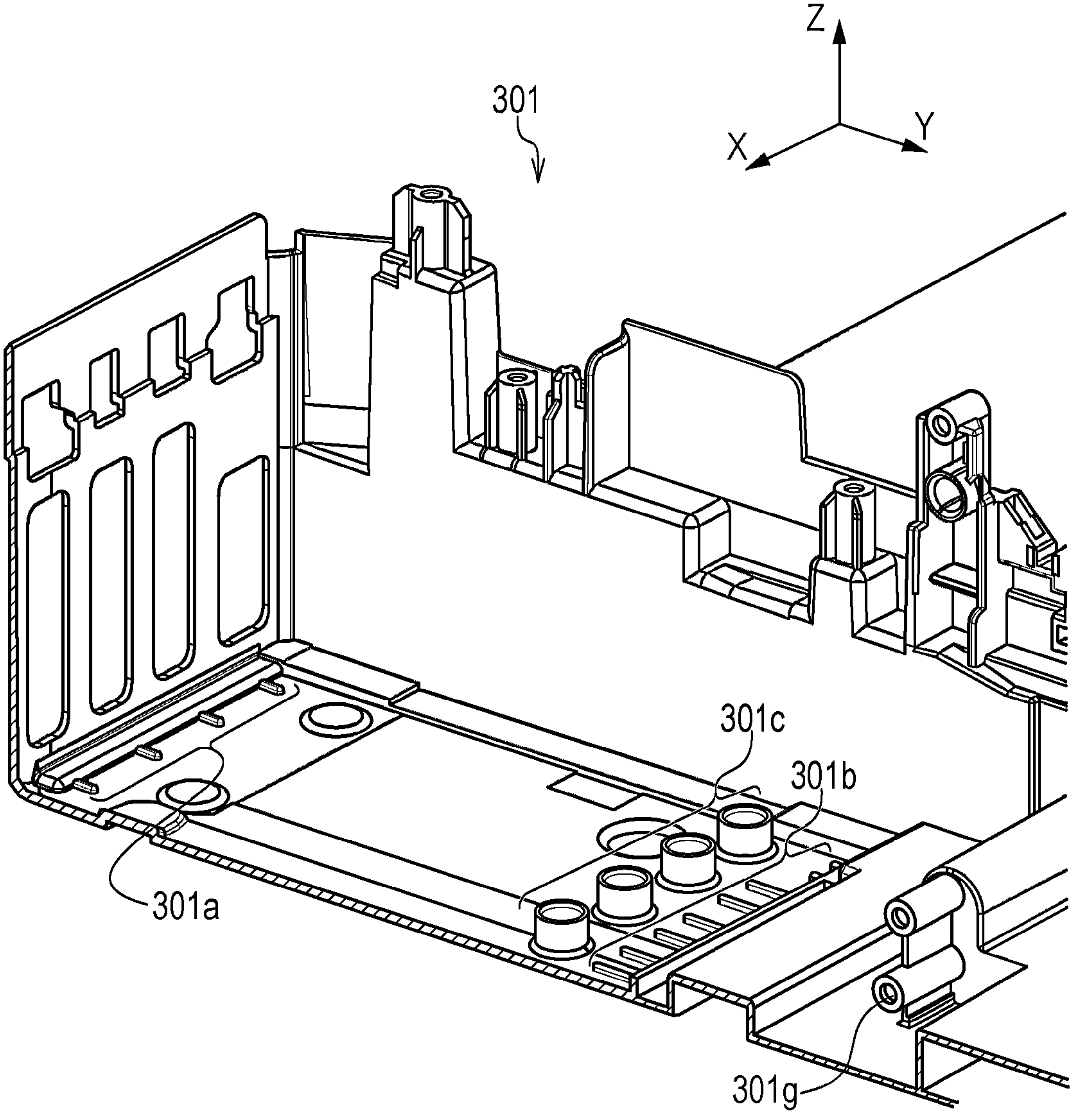
FIG. 5 is a perspective view of a case from above, to which the ink tanks according to the first embodiment can be fixed.

Next, with reference to FIGS. 4 and 5, the fixing of each of the ink tanks 8 to the recording apparatus 50 (the case 301) will now be described. FIG. 4A is a perspective view of the ink tank 8K from below. FIG. 4B is a perspective view of the ink tank 8Y from below. In the present embodiment, the ink tank 8Y is taken as an example because the structure of the ink tank 8M, 8C is the same as that of the ink tank 8Y. However, the present disclosure may be applied to a case where the structure differs from one ink tank to another. FIG. 5 is a perspective view of the case 301 from above, to which each of the ink tanks 8 can be fixed.

A protrusion 8*a*, a protrusion 8*b*, and a boss 8*h* are provided on the bottom face of each of the ink tanks 8. A rib 8*e* is provided on the ink tank 8K. A rib 8*f*, which can be brought into engagement with the rib 8*e*, is formed on each of the ink tanks 8C, 8M, and 8Y. A to-be-fastened portion 8*g* is further provided on the ink tank 8K.

A contact face 301*a*, with which the protrusion 8*a* is brought into contact and engagement, a contact face 301*b*, with which the protrusion 8*b* is brought into contact and engagement, and a hole 301*c*, with which the boss 8*h* is brought into engagement, are provided in the case 301. The engagement of them restricts the movement of the respective ink tanks 8 in the X-Y direction (horizontal direction) and the Z direction (the direction of gravity). With the structure described above, it is possible to temporarily fix each of the ink tanks 8 to the case 301 just by attaching the tank to the case 301 from above, making assembly work easier.

Figure 6B:
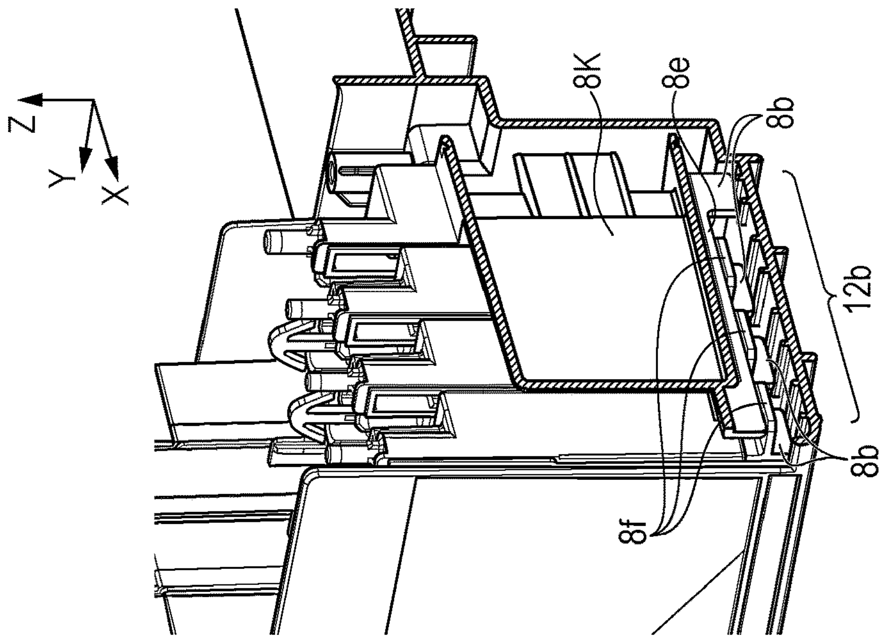
FIG. 6A, 6B is a diagram for explaining Z-directional movement restriction of the ink tanks according to the first embodiment.
Figure 6A:
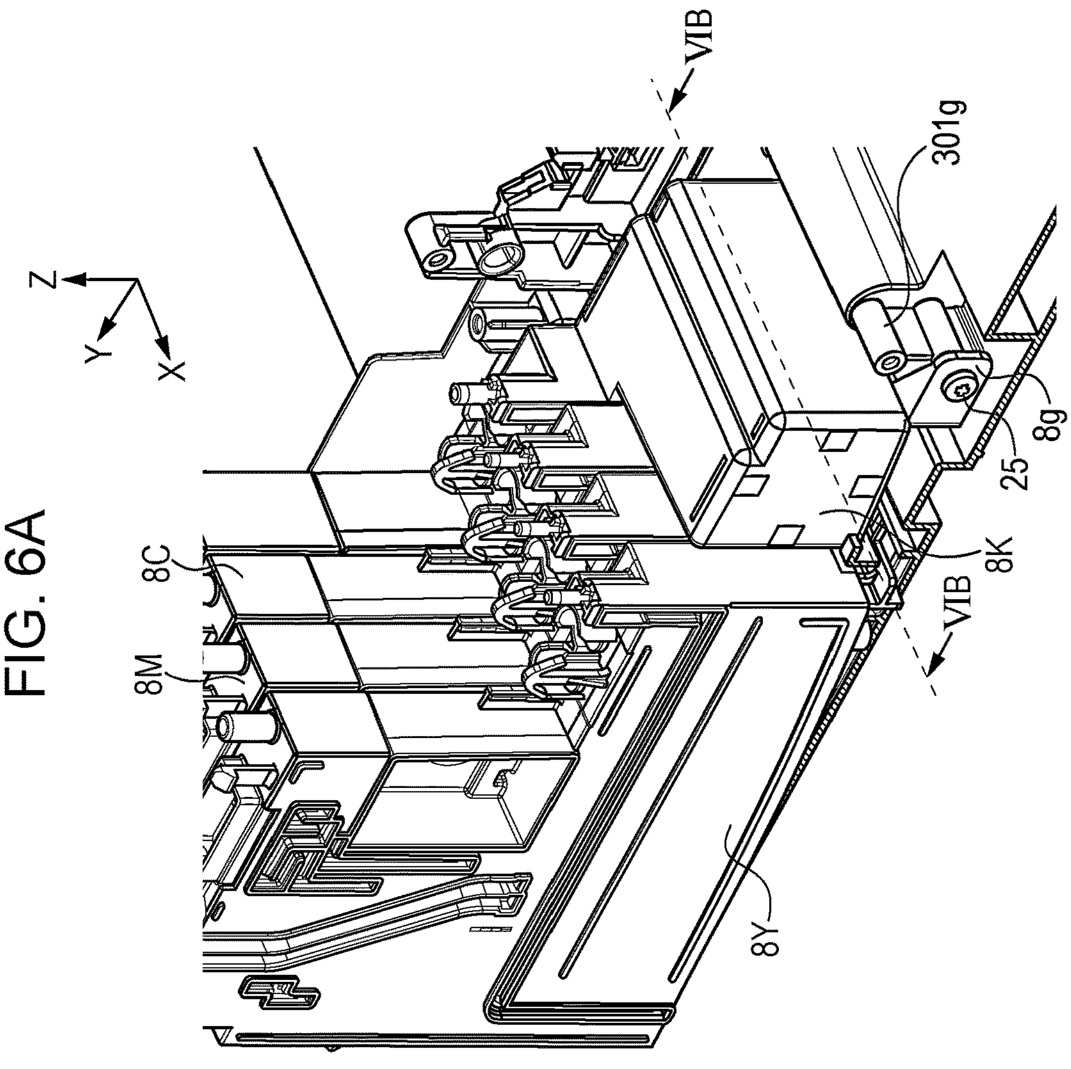

Next, with reference to FIG. 6, the restriction of movement of each of the ink tanks 8 in the Z direction will now be described. FIG. 6A is a perspective view of a state in which each of the ink tanks 8 is attached to the case 301 from a state illustrated in FIG. 5. FIG. 6B is a cross-sectional view taken along the line VIB-VIB of FIG. 6A.

When attaching the ink tanks 8 to the case 301, after performing attachment of the ink tanks 8C, 8M, and 8Y for color ink first, the user performs attachment of the ink tank 8K for black ink. Since the attachment of the ink tank 8K is performed last, the rib 8*e* is disposed over each of the ribs 8*f* as illustrated in FIG. 6B. Therefore, the movement of the rib 8*f* of each of the ink tanks 8C, 8M, and 8Y in the Z direction is restricted by the rib 8*e* of the ink tank 8K.

Moreover, a fastening portion 301*g* corresponding to the to-be-fastened portion 8*g* of the ink tank 8K is formed on the case 301 (see FIG. 5). The to-be-fastened portion 8*g* is fastened to the fastening portion 301*g* with a screw 25 as illustrated in FIG. 6A. With the structure described above, it is possible to restrict the movement of each of the ink tanks 8 in the Z direction with respect to the case 301.

Figure 7B:
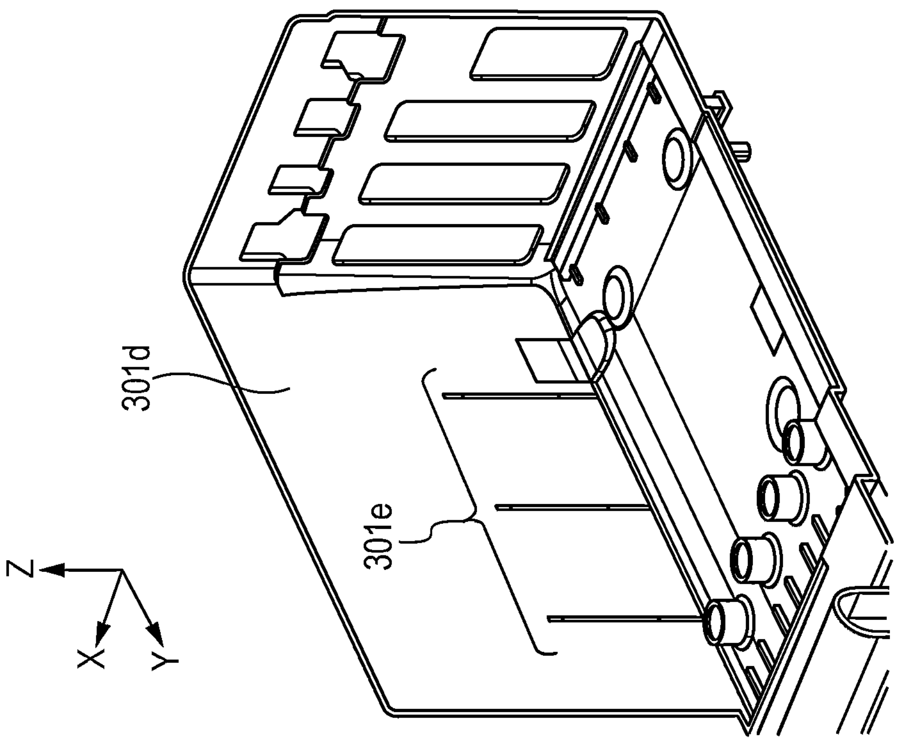
FIG. 7A, 7B is a diagram for explaining a positional relationship between the ink tank and the case according to the first embodiment.
Figure 7A:
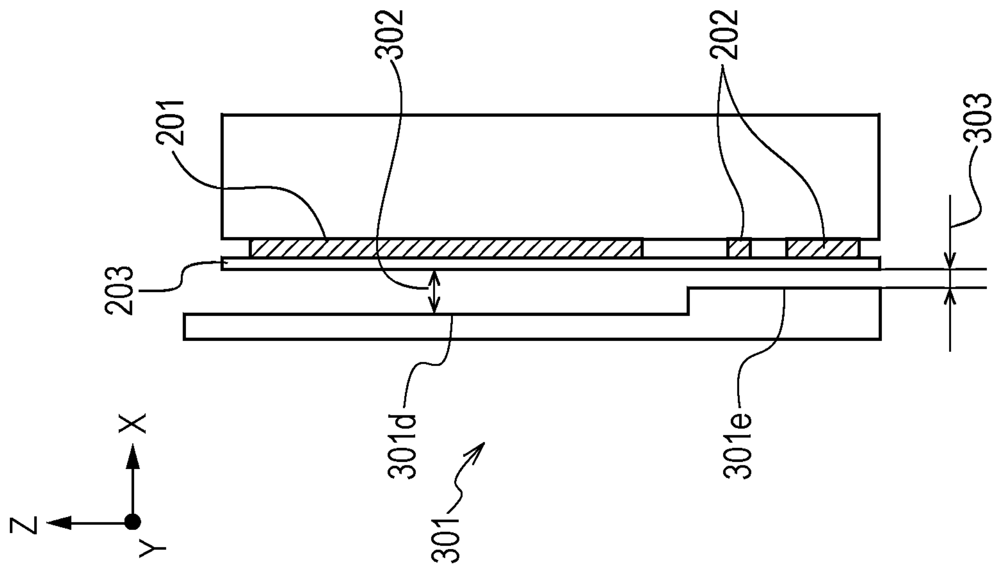

FIG. 7 is a set of diagrams for explaining a positional relationship between the ink tank 8 attached to the case 301, and the case 301. FIG. 7A is a side view, taken from the downstream side in the Y direction, of a positional relationship between the ink tank 8 (in the present embodiment, the ink tank 8Y) and the case 301. FIG. 7B is a perspective view, taken from the downstream side in the Y direction and from above, of the case 301 in a state in which the ink tank 8 is not attached thereto.

The case 301 includes a wall portion 301*d* that faces the ink tank 8Y and a protruding portion 301*e* that protrudes from the wall portion 301*d*. As illustrated in FIG. 7B, the protruding portion 301*e* has a linear shape extending in the Z direction, and, in the present embodiment, is formed as three lines of protrusions spaced apart from one another in the Y direction. The protruding portion 301*e* is provided at a position where it faces the rib 202 of the ink tank 8Y, that is, at a lower position in the Z direction. Therefore, the protruding portion 301*e* is provided at a position where it does not face the outline rib 201.

That is, a distance 303 between the protruding portion 301*e* and the film 203 that is fusion-bonded to the rib 202 is shorter than a distance 302 between the wall portion 301*d* and the film 203 that is fusion-bonded to the outline rib 201. This structure makes it easier for the film 203 of the ink tank 8 to come into contact with the protruding portion 301*e* than with the wall portion 301*d* when the ink tank 8 or the case 301 moves due to, for example, a shock applied at the time of transportation of the recording apparatus 50. Therefore, it is possible to prevent damage to the film 203 that is fusion-bonded to the outline rib 201 constituting each buffer chamber and each flow passage that can contain ink and thus to suppress liquid leakage from the ink tank 8.

Furthermore, with the structure described above, there is no need to provide a protection member between the film 203 (the ink tank 8) and the case 301. For this reason, as compared with a case where a protection member is provided or a case where the ink tank 8 and the case 301 are disposed with sufficient spacing therebetween, it is possible to make the distance between the ink tank 8 and the case 301 shorter and thus to reduce the size of the recording apparatus 50 with a simple and low-cost structure.

Second Embodiment

A second embodiment will now be described. An explanation of the same structure as that of the first embodiment will not be repeated. FIG. 8 is a diagram for explaining the structure of the ink tank 8 and the case 301 according to a second embodiment. FIG. 8A is a right side view of the ink tank 8Y. In the present embodiment, ribs 202*c* and 202*d* are provided in addition to the ribs 202*a* and 202*b* of the first embodiment. The ribs 202*c* and 202*d* are provided at an upper portion of the ink tank 8Y. In the description below, the ribs 202*a*, 202*b*, 202*c*, and 202*d* will be collectively referred to also as the rib(s) 202.

Figure 8B:
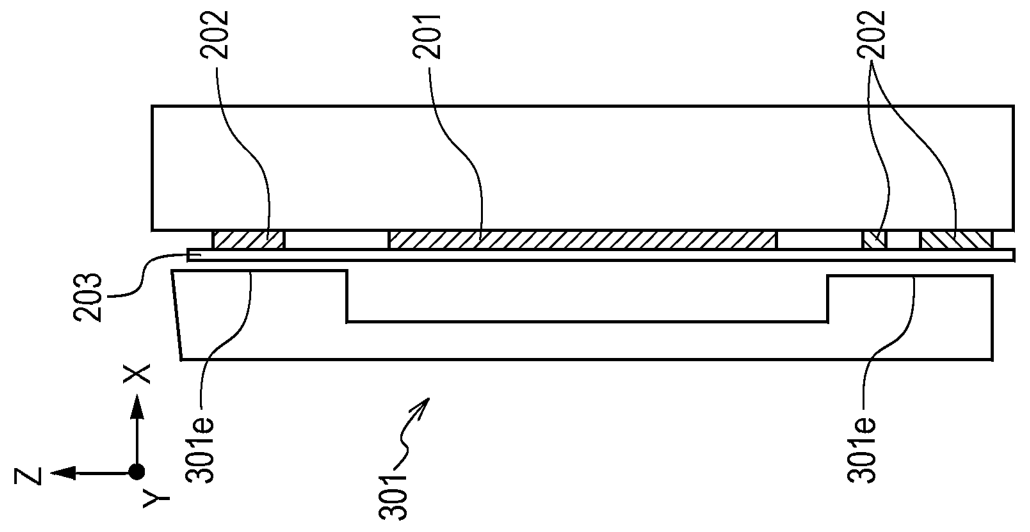
FIG. 8A, 8B is a diagram for explaining the structure of an ink tank and a case according to a second embodiment.
Figure 8A:
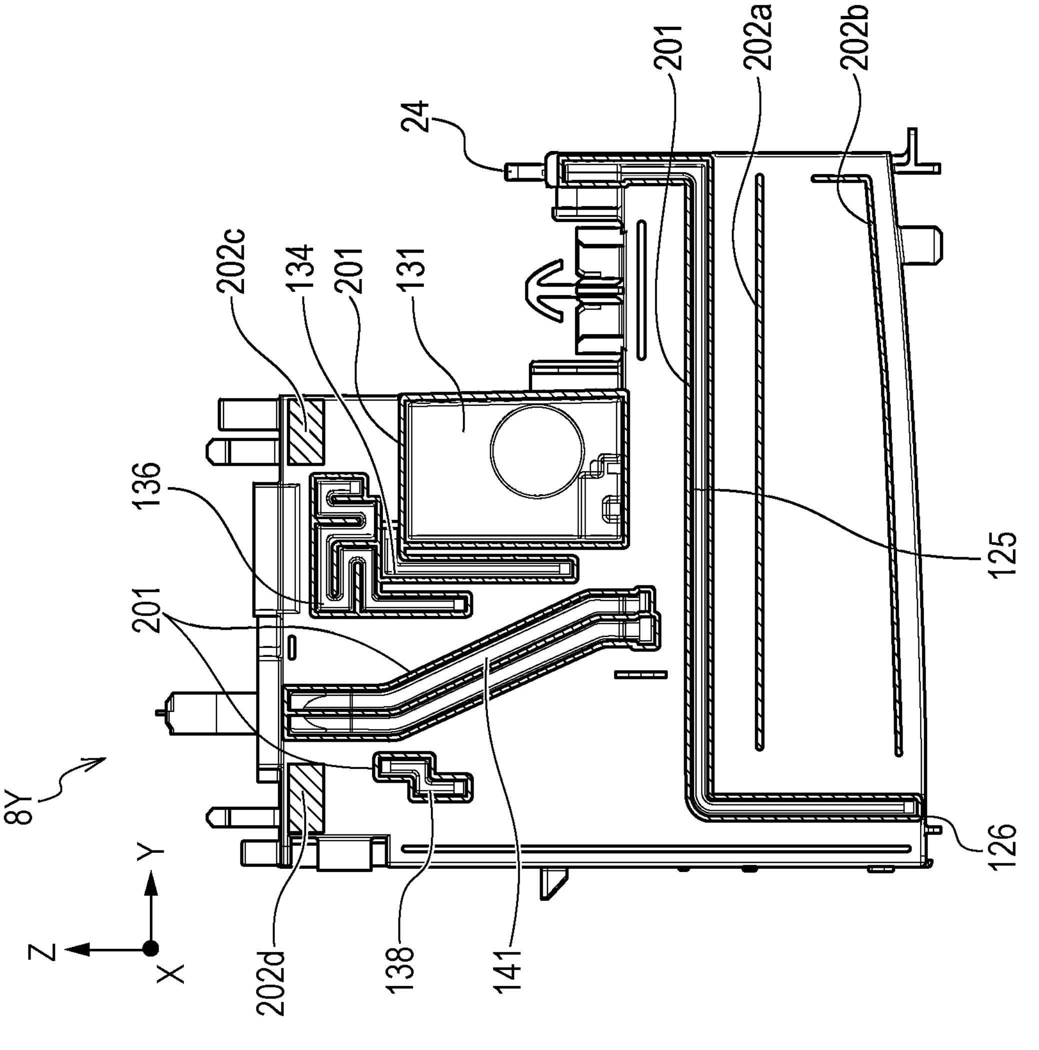

FIG. 8B is a side view of the neighborhood of the rib 202 when the ink tank 8Y is viewed from the downstream side in the Y direction. In the second embodiment, the protruding portion 301*e* of the case 301 is provided also at a position corresponding to the ribs 202*c* and 202*d*. Since the rib 202 and the protruding portion 301*e* are provided also at a position different from that of the first embodiment as described here, it is possible to further enhance the effect of suppressing liquid leakage from the ink tank 8.

Third Embodiment

Figure 9B:
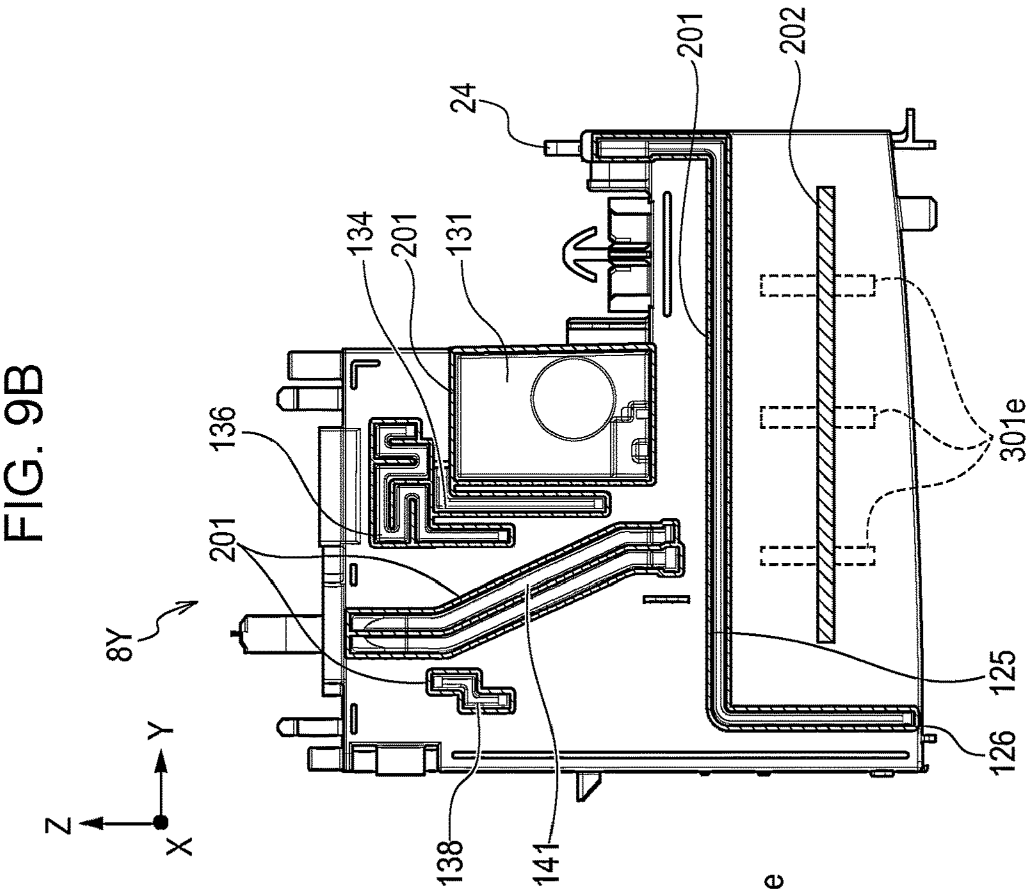
FIG. 9A, 9B is a diagram for explaining the structure of an ink tank and a case according to a third embodiment.
Figure 9A:
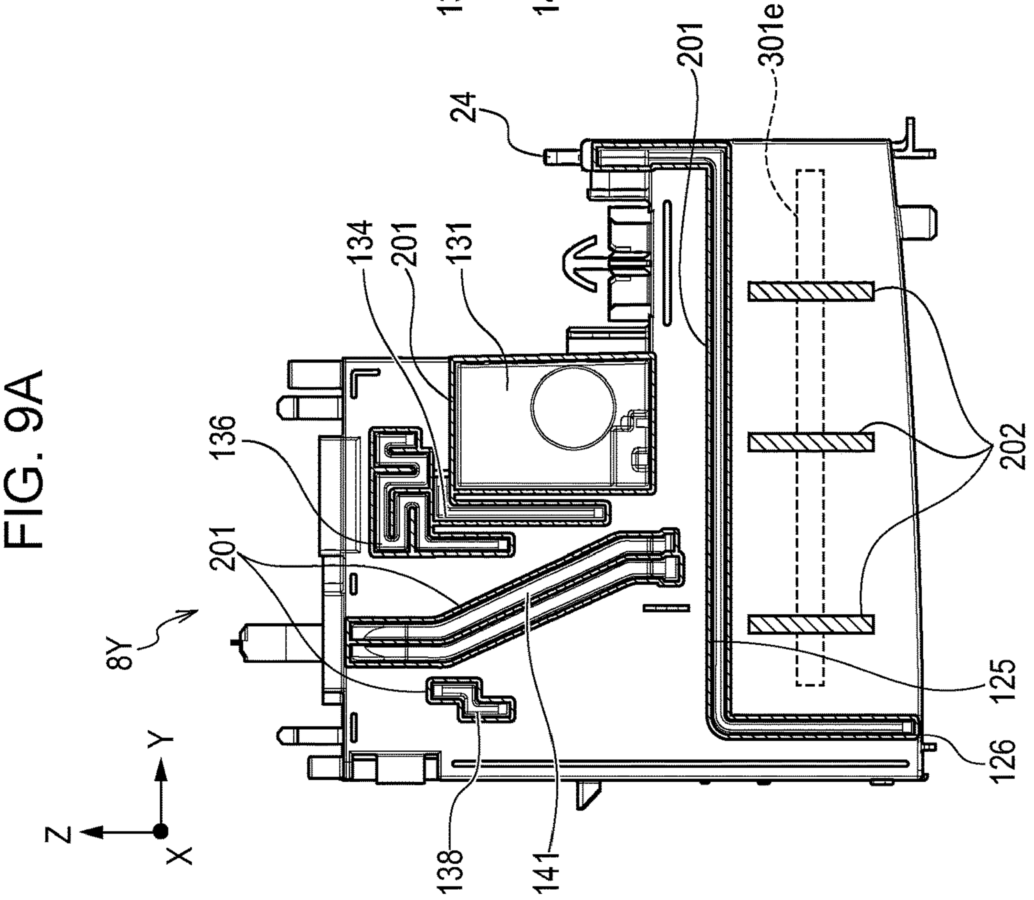

FIG. 9 is a diagram for explaining the structure of the ink tank 8 and the case 301 according to a third embodiment. FIGS. 9A and 9B are right side views of the ink tank 8Y. A variation example of FIG. 9A is illustrated in FIG. 9B. Having been described in the first embodiment is a structure in which a plurality of ribs 202 and a plurality of protrusions as the protruding portion 301*e* are provided.

In the present embodiment, a plurality of ribs 202 (in FIG. 9A, three ribs) is provided, whereas a single protrusion only is provided as the protruding portion 301*e* (indicated by broken-line illustration in FIG. 9A) facing them. In the present embodiment, the rib 202 has a linear shape extending in the Z direction, and the protruding portion 301*e* has a linear shape extending in the Y direction. Since the rib 202 and the protruding portion 301*e* extend in directions orthogonal to each other, it is possible to produce the same effect as that of the first embodiment without any need for providing a plurality of protrusions e.

FIG. 9B illustrates a structure in which a single rib 202 is provided and a plurality of protrusions (in FIG. 9B, three protrusions) is provided as the protruding portion 301*e* (indicated by broken-line illustration in FIG. 9B) facing it. In the variation example illustrated in FIG. 9B, the rib 202 has a linear shape extending in the Y direction, and the protruding portion 301*e* has a linear shape extending in the Z direction. Also in this variation example, the same effect as that of the first embodiment can be expected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-136260, filed on Aug. 24, 2023, which is hereby incorporated by reference herein in its entirety.

What is claimed is:

1. A liquid tank for fitment in a liquid ejecting apparatus comprising a wall with a protruding portion protruding from the wall, the liquid tank comprising:

a tank container including a chamber configured to contain a liquid for supplying liquid to an ejection head of the liquid ejecting apparatus, the chamber having an opening at a side face of the tank container;

a first rib protruding outwards from an outer wall that forms a wall of the chamber, the first rib protruding from an opposite side of the wall to that of the chamber, an outline of the opening being enclosed by the first rib;

a second rib protruding outwards from the outer wall that forms the wall of the chamber, the second rib protruding from an opposite side of the wall to that of the chamber; and a film, the film sealing the opening and being bonded to the first and second ribs;

wherein, once the tank is fitted in the liquid ejecting apparatus, a gap between the first rib and wall of the liquid ejection apparatus is greater than a gap between the second rib and the protruding portion of the wall of the liquid ejection apparatus.

2. The liquid tank according to claim 1, wherein a plurality of second ribs, each as the second rib, is provided on the tank container.

3. The liquid tank according to claim 1, wherein the or each second rib has a linear shape extending in a horizontal direction when fitted.

4. The liquid tank according to claim 1, wherein the tank container further includes an outlet portion, through which the liquid contained in the chamber is let out, and a passage, through which the chamber is in communication with the outlet portion and which has an opening in a direction opposite to the opening of the chamber, and the opening of the passage is sealed by a second film different from the film.

5. The liquid tank according to claim 1, wherein the tank container further includes a second chamber having an opening in a direction opposite to the opening of the chamber and configured to contain air, and the opening of the second chamber is sealed by a second film different from the film.

* * * * *